US011831388B2

(12) United States Patent
Svendsen et al.

(10) Patent No.: US 11,831,388 B2
(45) Date of Patent: Nov. 28, 2023

(54) BEAM SWITCHING

(71) Applicant: NOKIA TECHNOLOGIES OY, Espoo (FI)

(72) Inventors: Simon Svendsen, Aalborg (DK); Samantha Caporal Del Barrio, Aalborg (DK); Christian Rom, Aalborg (DK); Benny Vejlgaard, Gistrup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/845,516

(22) Filed: Jun. 21, 2022

(65) Prior Publication Data

US 2022/0416877 A1 Dec. 29, 2022

(30) Foreign Application Priority Data

Jun. 28, 2021 (FI) ..................................... 20215766

(51) Int. Cl.
*H04B 7/08* (2006.01)
(52) U.S. Cl.
CPC ......... *H04B 7/0888* (2013.01); *H04B 7/0857* (2013.01)
(58) Field of Classification Search
CPC .... H04B 7/0888; H04B 7/0857; H04B 7/088; H04B 7/0695
See application file for complete search history.

(56) References Cited

U.S. PATENT DOCUMENTS

| 2020/0059398 | A1 | 2/2020 | Pan et al. | |
|---|---|---|---|---|
| 2021/0243768 | A1* | 8/2021 | Thomas | H04B 7/088 |
| 2022/0078848 | A1* | 3/2022 | Hu | H04W 72/046 |
| 2022/0386139 | A1* | 12/2022 | Wu | H04W 24/10 |
| 2023/0188195 | A1* | 6/2023 | Wang | H04B 7/0408 |
| | | | | 375/262 |

FOREIGN PATENT DOCUMENTS

| WO | WO-2021207617 A1 * | 10/2021 | ........ H04W 72/0446 |
|---|---|---|---|
| WO | WO-2023014547 A1 * | 2/2023 | .......... H04W 72/046 |

OTHER PUBLICATIONS

Machine translation of CN-114258700-A. (Year: 2023).*

(Continued)

*Primary Examiner* — Jean B Corrielus
(74) *Attorney, Agent, or Firm* — SQUIRE PATTON BOGGS (US) LLP

(57) ABSTRACT

An apparatus, method and computer program is described comprising: receiving, at a user device, a downlink reference signal from a communication node of a mobile communication system, wherein the downlink reference signal is received by one of a plurality of beams of a receiver of the user device in accordance with a configured beam alignment; determining whether to initiate beam switching to reconfigure the beam alignment at said receiver based, at least in part, on a signal power of the received downlink reference signal; and determining, in the event that beam switching is to be initiated, whether to initiate communication node assisted beam switching or non-communication node assisted beam switching.

14 Claims, 14 Drawing Sheets

(56) References Cited

OTHER PUBLICATIONS

3GPP TS 38.214 V16.5.0 (Mar. 2021), Technical Specification, 3rd Generation Partnership Project; Technical Specification Group Radio Access Network; NR; Physical Layer procedures for data (Release 16), Mar. 2021.
3GPP TR 38.802 V14.2.0 (Sep. 2017), Technical Report, 3rd Generation Partnership Project; Technical Specification Group Radio Access Network; Study on New Radio Access Technology Physical Layer Aspects (Release 14), Sep. 2017.
Extended European Search Report dated Nov. 10, 2022, corresponding to European Patent Application No. 22179881.2.

* cited by examiner

BEAM SWITCHING

FIELD

The present specification relates to beam switching, for example beam switching in mobile communication systems.

BACKGROUND

A communication node (e.g. a base station) of a mobile communication system may comprise a number of beams that can be used to establish communication links with user devices. Similarly, a user device may comprise a number of beams that can be used to establish communication link with base stations or other communication nodes. Although developments have been made for beam switching in such systems, there remains a need for further developments.

SUMMARY

In a first aspect, this specification describes an apparatus comprising means for performing: receiving, at a user device, a downlink reference signal from a communication node (e.g. a base station or gNB) of a mobile communication system, wherein the downlink reference signal is received by one of a plurality of beams of a receiver of the user device in accordance with a configured beam alignment; determining whether to initiate beam switching to reconfigure the beam alignment at said receiver based, at least in part, on a signal power (e.g. RSRP) of the received downlink reference signal; and determining, in the event that beam switching is to be initiated, whether to initiate communication node assisted beam switching (e.g. "non-adjacent" beam switching) or non-communication node assisted beam switching (e.g. "adjacent" beam switching).

Some example embodiments further comprise means for performing: sending a signal to the communication node triggering communication node assistance in the event that a determination is made to initiate communication node assisted beam switching.

Some example embodiments further comprise means for performing: initiating autonomous beam switching at the user device in the event that a determination is made to initiate non-communication node assisted beam switching.

Some example embodiments further comprise means for performing: determining the signal power of the received downlink reference signal; and comparing the determined signal power to a threshold power level for use in determining whether to initiate beam switching. For example, a determination may be made regarding whether the signal power has dropped below the relevant threshold power level.

Some example embodiments further comprise means for performing: identifying whether a channel between the communication node and the user device supports one or more usable candidate links other than a first link used for the configured beam alignment. For example, a usable candidate link may provide another UE beam to the same serving communication node (e.g. serving gNB). That link may be "usable" based on whether the signal level (e.g. RSRP) is above a threshold level and/or whether the respective beam is coming from a secondary angle group. The means for performing identifying whether the channel between the communication node and the user device supports one or more usable candidate links of the receiver other than the first link used for the configured beam alignment may comprise analysing a power delay profile (PDP) of the received downlink reference signal (e.g. determining whether any PDP signals are above threshold levels).

The apparatus may further comprise means for performing: determining whether a Doppler shift of the received downlink reference signal is above a threshold level; initiating non-communication node assisted beam switching in the event that beam switching is initiated, no usable candidate links other than the first link are identified and the Doppler shift of the received downlink reference signal is not above the threshold level; and not initiating beam switching in the event that no usable candidate links other than the first link are identified and the Doppler shift is above the threshold level. Alternatively, or in addition, the apparatus may further comprise means for performing: initiating communication node assisted beam switching in the event that beam switching is initiated, one or more usable candidate links other than the first link are identified and said usable candidate links include at least one link directed in a different direction (e.g. having relative angles of arrival (AoAs) above a threshold difference) to the first link used for the configured beam alignment and/or on a different receiver panel of the user device; and initiating non-communication node assisted beam switching in the event that beam switching is initiated, one or more usable candidate links other than the first link are identified and said usable candidate links do not include any links directed in a different direction to the first link.

The means may comprise: at least one processor; and at least one memory including computer program code, the at least one memory and the computer program code configured, with the at least one processor, to cause the performance of the apparatus.

In a second aspect, this specification describes a method comprising: receiving, at a user device, a downlink reference signal from a communication node of a mobile communication system, wherein the downlink reference signal is received by one of a plurality of beams of a receiver of the user device in accordance with a configured beam alignment; determining whether to initiate beam switching to reconfigure the beam alignment at said receiver based, at least in part, on a signal power of the received downlink reference signal; and determining, in the event that beam switching is to be initiated, whether to initiate communication node assisted beam switching or non-communication node assisted beam switching.

The method may further comprise: sending a signal to the communication node triggering communication node assistance in the event that a determination is made to initiate communication node assisted beam switching.

The method may further comprise: initiating autonomous beam switching at the user device in the event that a determination is made to initiate non-communication node assisted beam switching.

The method may further comprise one or more of: identifying whether a channel between the communication node and the user device supports one or more usable candidate links other than a first link used for the configured beam alignment; determining whether a Doppler shift of the received downlink reference signal is above a threshold level; initiating non-communication node assisted beam switching in the event that beam switching is initiated, no usable candidate links other than the first link are identified and the Doppler shift of the received downlink reference signal is not above the threshold level; and not initiating beam switching in the event that no usable candidate links other than the first link are identified the Doppler shift is above the threshold level. The method may further comprise: initiating communication node assisted beam switching in the event that beam switching is initiated, one or more usable candidate links other than the first link are identified and said usable candidate links include at least one link directed in a different direction to the first link for the configured beam alignment and/or on a different receiver panel of the user device; and initiating non-communication node assisted beam switching in the event that beam switching is initiated, one or more usable candidate links other than the first link are identified and said usable candidate links do not include any links directed in a different direction to the first link.

In a third aspect, this specification describes an apparatus configured to perform any (at least) any method as described with reference to the second aspect.

In a fourth aspect, this specification describes computer-readable instructions which, when executed by a computing apparatus, cause the computing apparatus to perform (at least) any method as described with reference to the second aspect.

In a fifth aspect, this specification describes a computer-readable medium (such as a non-transitory computer-readable medium) comprising program instructions stored thereon for performing (at least) any method as described with reference to the second aspect.

In a sixth aspect, this specification describes an apparatus comprising: at least one processor; and at least one memory including computer program code which, when executed by the at least one processor, causes the apparatus to perform (at least) any method as described with reference to the second aspect.

In a seventh aspect, this specification describes a computer program comprising instructions for causing an apparatus to perform at least the following: receiving, at a user device, a downlink reference signal from a communication node of a mobile communication system, wherein the downlink reference signal is received by one of a plurality of beams of a receiver of the user device in accordance with a configured beam alignment; determining whether to initiate beam switching to reconfigure the beam alignment at said receiver based, at least in part, on a signal power of the received downlink reference signal; and determining, in the event that beam switching is to be initiated, whether to initiate communication node assisted beam switching or non-communication node assisted beam switching.

In an eighth aspect, this specification describes an apparatus comprising: a receiver (or some other means) for receiving, at a user device, a downlink reference signal from a communication node of a mobile communication system, wherein the downlink reference signal is received by one of a plurality of beams of a receiver of the user device in accordance with a configured beam alignment; a first control module (or some other means) for determining whether to initiate beam switching to reconfigure the beam alignment at said receiver based, at least in part, on a signal power of the received downlink reference signal; and a second control module (or some other means) for determining, in the event that beam switching is to be initiated, whether to initiate communication node assisted beam switching or non-communication node assisted beam switching.

BRIEF DESCRIPTION OF DRAWINGS

Example embodiments will now be described, by way of non-limiting examples, with reference to the following schematic drawings, in which.

DETAILED DESCRIPTION

Figure 1:
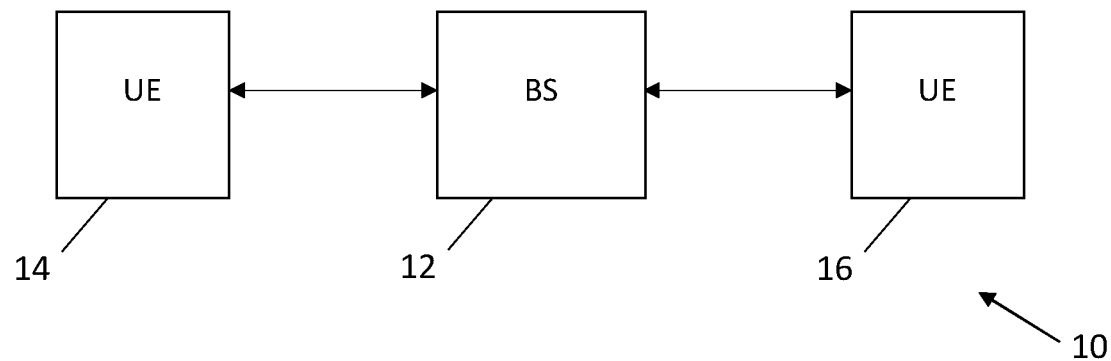
FIG. 1 is a block diagram of a system in accordance with an example embodiment.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of a system, indicated generally by the reference numeral 10, in accordance with an example embodiment. The system 10 comprises a mobile base station 12, such as a next generation node B (gNB), a first user device 14 and a second user device 16. Two-way communications are provided between each user device and the base station 12.

Figure 2:
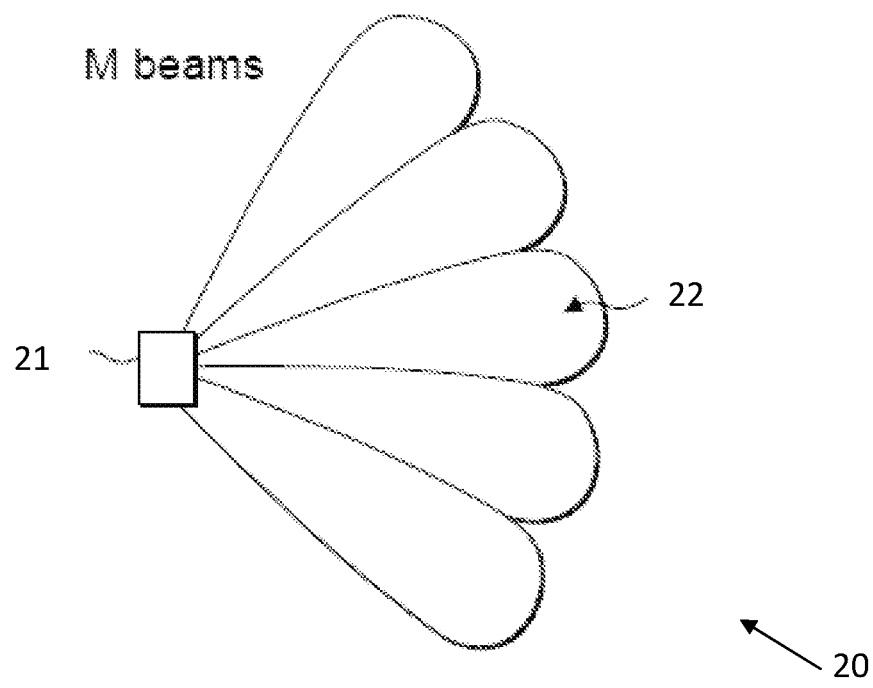
FIG. 2 is a block diagram of a system in accordance with an example embodiment.

FIG. 2 is a block diagram of a system, indicated generally by the reference numeral 20, in accordance with an example embodiment. The system 20 comprises a node 21 of a mobile communication system (such as the base station 12 or one of the user devices 14 and 16 described above). In use, the node 21 communicates with one or more other nodes of the communication system.

As shown in FIG. 2, the node 21 comprises a number of beams (such as the beam 22) that can be used to set up communication links (e.g. between a base station and one or more user devices, between a user device and one or more base station or between one user device and another). As discussed in detail below, a beam selection algorithm may be provided to select one of the beams 22 for use in communication (e.g. by selecting the best or strongest available beam according to some metric, such as received signal strength and/or signal to noise ratio).

Figure 3:
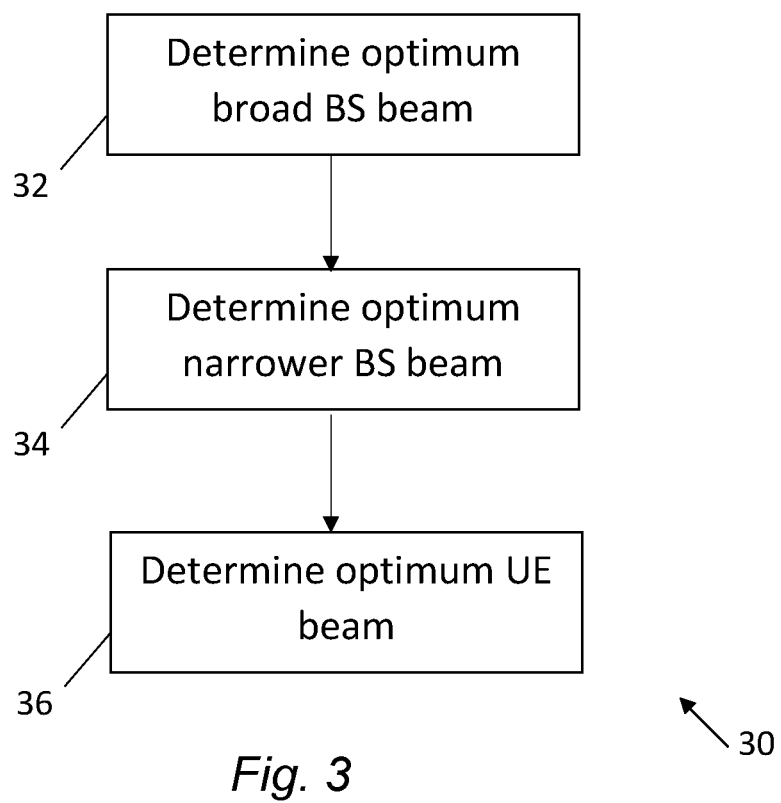
FIG. 3 is a flow chart showing an algorithm in accordance with an example embodiment.

FIG. 3 is a flow chart showing an algorithm, indicated generally by the reference numeral 30, in accordance with an example embodiment.

The algorithm 30 has a first phase, indicated generally by the reference numeral 32, in which transmission beam sweeping is used to determine an optimum broad base station beam for transmissions between a base station (such as the base station 12 described above) and a relevant user device (such as one of the user devices 14 and 16 described above). The first phase 32 may be implemented by the base station 12 transmitting a first sequence of beams from the base station to the user device. The user device measures the Reference signal Received Power (RSRP) or some other signal quality indicator, such as channel quality indicator (CQI) or rank indicator (RI) for the multiple beams in order to determine the best (e.g. strongest) beam amongst the broad beams of the first phase.

The algorithm 30 has a second phase, indicated generally by the reference numeral 34, in which transmission beam sweeping is used to determine an optimum narrower base station beam for transmissions between the base station and the relevant user device. The second phase may be implemented by the base station transmitting a second sequence of beams from the base station to the user device. The second sequence of beams are within a range identified in the operation 32 as the best range of the first sequence of beams.

In the second phase 34, the relevant user device measures RSRP (or some other signal quality indicator, such as CQI or RI) for the multiple beams in order to determine the best beam amongst the narrower beams of the second phase. This best beam is selected for transmissions from the base station to the user device.

The algorithm 30 has a third phase, indicated generally by the reference numeral 36, in which in which receiver beam sweeping is used to determine an optimum user device beam for transmissions between the base station and the relevant user device. The third phase may be implemented by the base station transmitting a third sequence of beams from the base station to the user device. The third sequence of beams is transmitted with the beam identified as the best transmission beam in the second phase and the user device performs beam sweeping to identify the best narrow RX beam for transmission between the base station and the user device.

Thus, base station beam sweeping occurs in the operations 32 and 34 and user device beam sweeping occurs in the operation 36 in order to determine optimum base station and user device beams for communication.

Figure 4:
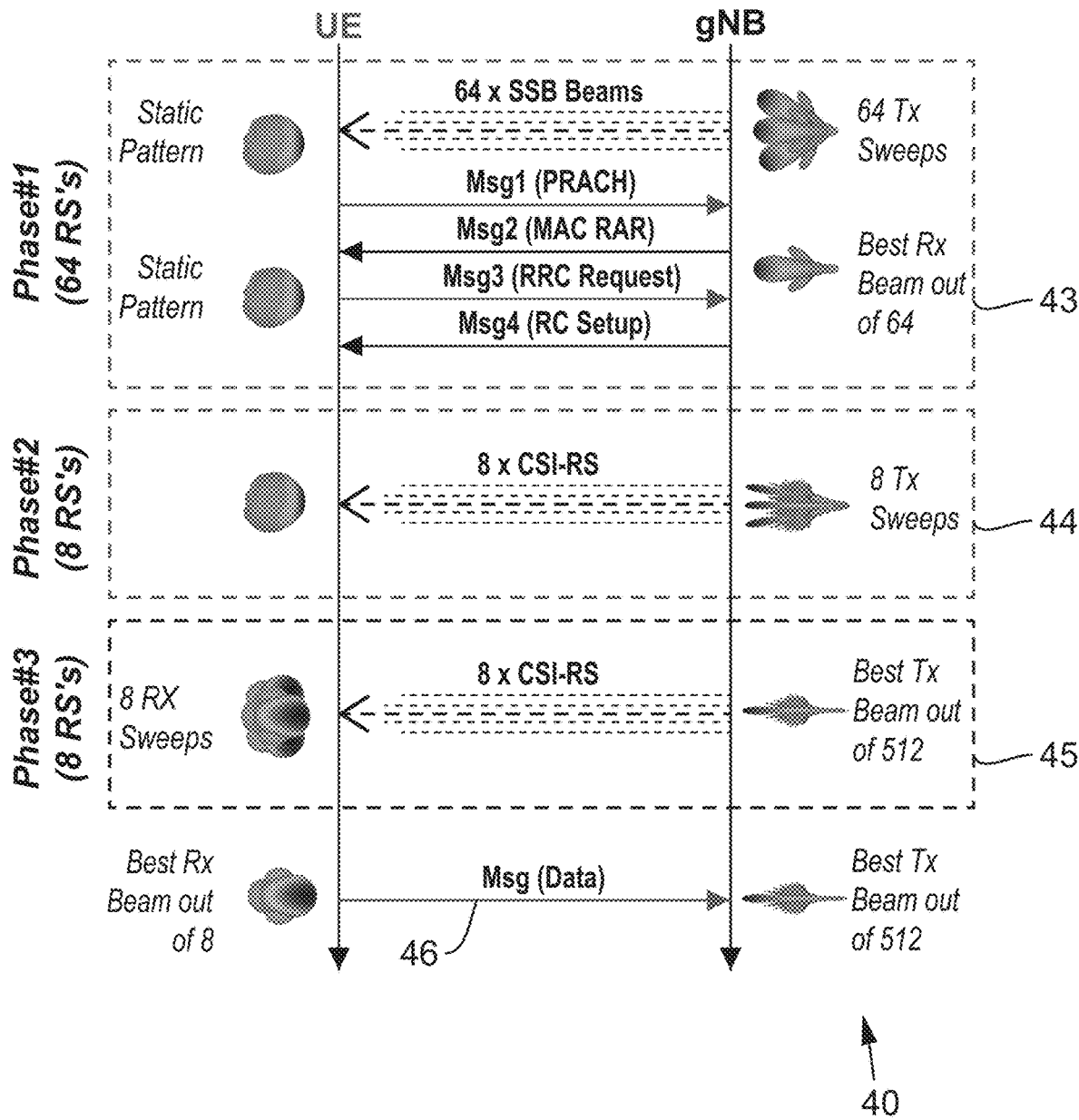
FIG. 4 shows a message sequence in accordance with an example embodiment.

FIG. 4 shows a message sequence, indicated generally by the reference numeral 40, in accordance with an example embodiment. The message sequence 40 in an example implementation of the algorithm 30 and shows messages transmitted between a user equipment (UE) and a communication node (gNB). The message sequence 40 is a beam alignment procedure set out in the 5G New Radio (NR) Release 15 as described in 3GPP TR 38.802 section 6.1.6 and in TS 38.214 section 5.2. In one example embodiment, the UE is an implementation of one of the user devices 14 and 16 and the gNB is an implementation of the base station 12.

The message sequence 40 includes a first phase 43 (implementing the first phase 32 of the algorithm 30 described above) in which up to 64 synchronisation signal beams (SSBs) are sent from the gNB to the UE, while the UE is assumed to configure a broad Rx beam to receive signals from a broad angle. The best measured synchronisation signal beam (e.g. based on RSRP or some other quality indicator) is used to determine the random-access beam. The UE reports back the best SSB according to the relevant metric back to the gNB at the next allocated time instance (e.g. the next random access channel (RACH) group).

The message sequence 40 includes a second phase 44 (implementing the second phase 34 of the algorithm 30 described above) in which the gNB transmits refined downlink (DL) channel state information (CSI) beams while the UE is assumed to still configure a broad RX beam. The UE measures RSRP (or some other quality metric) on a received CSI-RS and reports the best beam ID to gNB. For example, as shown in FIG. 4, the second phase 44 can be used to determine the best of 8 narrower transmitted beams from within the best broad transmit beam identified in the first phase 43.

The message sequence 40 includes a third phase 45 (implementing the third phase 36 of the algorithm 30 described above) in which the gNB repeats the best CSI beam identified in the second phase 44, such that the UE can sweep its refined RX beams to align its narrow UE RX beam.

At the end of the third phase 45, alignment between the best gNX TX beam and the best UE RX beam is obtained for maximized directional gain and/or minimum interference to other users in serving and neighbouring cells. Data communications can then take place, as indicated by the messages 46.

In the message sequence 40, after the first phase 43, the UE is RRC_Connected. The second and third phases are part of the initial access and may also be used for beam tracking and monitoring throughout a connection.

It should be noted that the algorithms 30 and 40 are provided by way of example only and a number of variants are possible. For example, in some example embodiments, the second phases 34 or 44 may be omitted.

In the message sequence 40, the UE may rely on the reference signals associated with NZP-CSI-RS-ResourceSet configured with the higher layer parameter repetition set to 'ON' from the gNB in order to perform its beam alignment procedure in the third phase 45. The repetition parameter indicates to the UE that the NZP-CSI-RS-ResourceSet are transmitted with the same downlink spatial filter (see TS38.214 section 5.1.6.1.2). The scheduling of such reference signals is controlled by the gNB and sent in an aperiodic fashion. This means that it is not the UE requesting alignment reference signals from the gNB, and that the UE is limited to waiting for the gNB to schedule such reference signals in order to align its Rx beam.

However, the gNB does not have all the knowledge on UE internal beam and panel management, hence the gNB may schedule NZP-CSI-RS-ResourceSet in a suboptimal manner.

To seek to trigger CSI-RS resources with repetition 'ON' in the most optimal manner, two beam switching types are discussed in detail below, namely:

Communication node assisted beam switching (or UE Non-Adjacent Beam Switch (N-ABS)); and Non-communication node assisted beam switching (or UE Adjacent Beam Switch (ABS))

Figure 5:
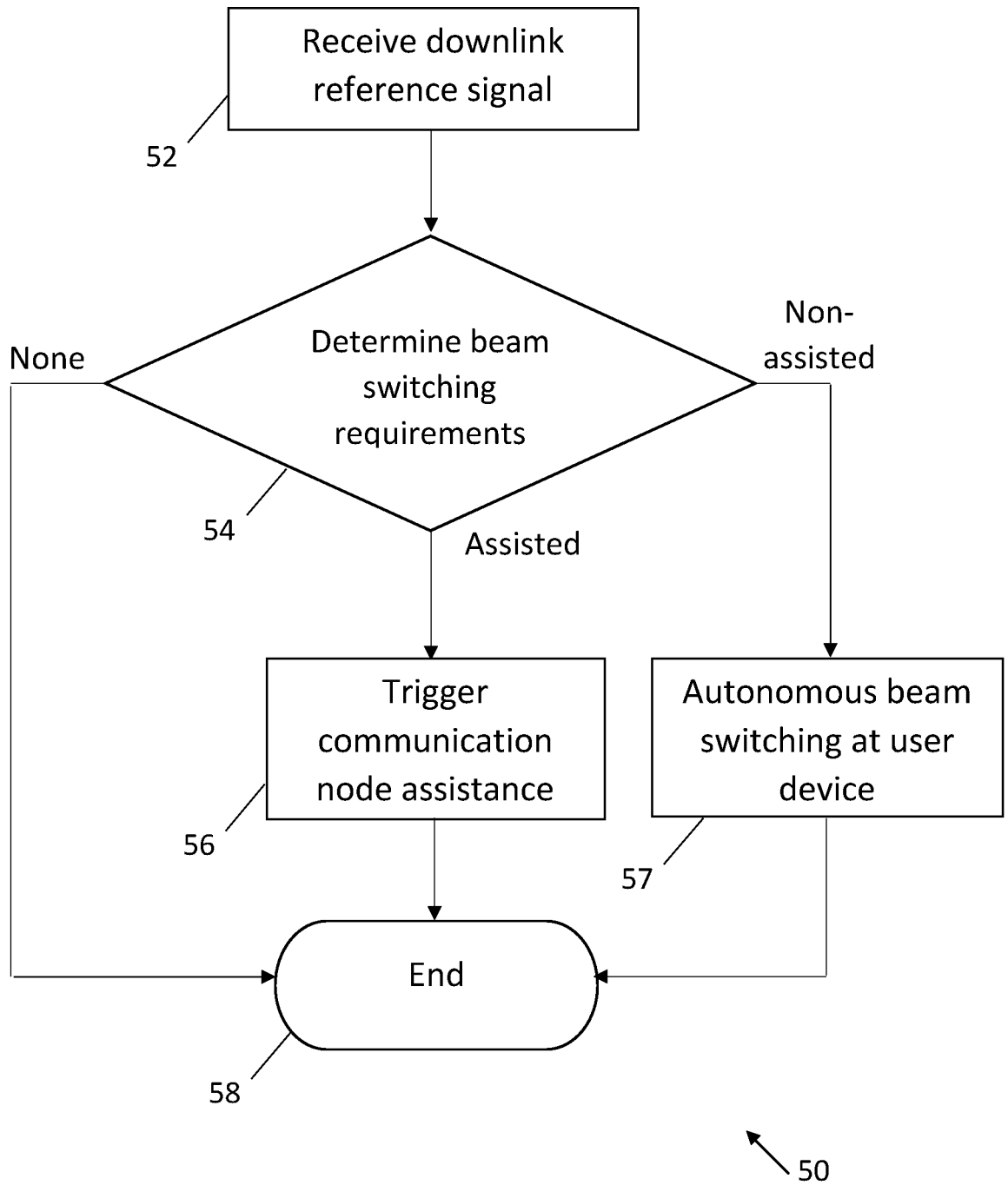
FIG. 5 is a flow chart showing an algorithm in accordance with an example embodiment.

FIG. 5 is a flow chart showing an algorithm, indicated generally by the reference numeral 50, in accordance with an example embodiment.

The algorithm 50 starts at operation 52, where a downlink reference signal is received at a user device (UE) from a communication node (e.g. a base station or gNB) of a mobile communication system. The downlink reference signal may be received by one of a plurality of beams of a receiver of the user device in accordance with a configured beam alignment.

At operation 54, beam switching requirements are determined. The operation 54 has two parts, which may be implemented as a single step (as suggesting in the message sequence 50) or as two separate steps (as discussed further below).

First, a determination may be made regarding whether to initiate beam switching to reconfigure the beam alignment at said receiver. This determination may be based, at least in part, on a strength (such as RSRP or some other metric) of the received downlink reference signal. If it is determined that no beam switching is to be performed, then the algorithm terminates at operation 58.

If it is determined that beam switching is to be initiated, then a determination is made regarding whether to initiate communication node assisted beam switching (e.g. non-adjacent beam switching) or non-communication node assisted beam switching (e.g. adjacent beam switching).

If communication node assisted beam switching is to be initiated, then the algorithm 50 moves from operation 54 to operation 56, where a signal to the communication node triggering communication node assistance (such as the third phase 45 of the message sequence 40 described above). The algorithm 50 then terminates at the operation 58.

If non-communication node assisted beam switching is to be initiated, then the algorithm 50 moves from operation 54 to operation 57, where autonomous beam switching at the user device is triggered. The algorithm 50 then terminates at the operation 58.

Figure 6:
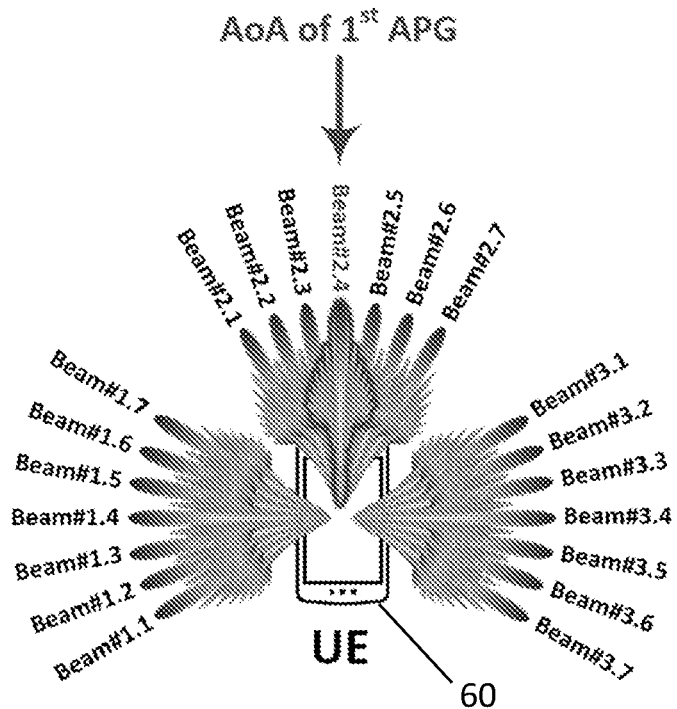
FIGS. 6 to 9 are block diagrams of user devices in accordance with example embodiments.

FIG. 6 is a block diagram of a user device (UE), indicated generally by the reference numeral 60, in accordance with an example embodiment. The user device 60 includes a number of beams organised into three groups (provided by three panels). The first group comprises beams 1.1 to 1.7, the second group comprises beams 2.1 to 2.7 and the third group comprises beams 3.1 to 3.7. Thus, 21 beams are available for receiving transmission signals, for example from a gNB. The signal channel shown in FIG. 6 is directive and comprises a single dominant Angular Power Group (APG) having an angle of arrival (AoA) such that the beam 2.4 represents the optimum beam for receiving transmission signals.

Figure 7:
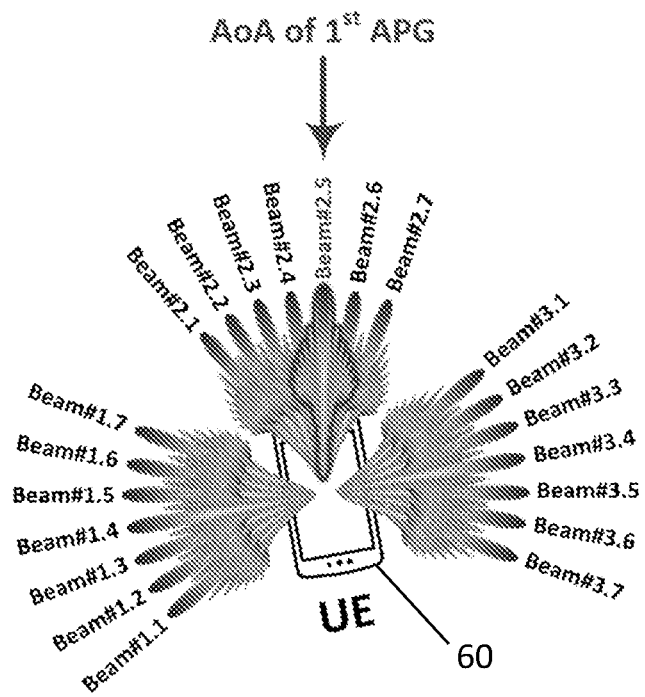

FIG. 7 is a block diagram of the user device 60. In the configuration shown in FIG. 7, the user device 60 has rotated relative to the transmission signal (e.g. relative to the respective gNB) such that the beam 2.5 now represents the optimum beam for receiving transmission signals.

Adjacent beam switching (or non-communication node assisted beam switching) can be implemented at the user device 60 since the channel being used for transmission is directive and comprises a single dominant Angular Power Group (APG) and the user device is rotating or moving relative to the gNB. This scenario could be valid for a dominant radio channel cluster with narrow angular spread, e.g. LOS channel or NLOS CDL-A channel model. Here the user device 60 switches from beam 2.4 to the adjacent beam 2.5 and within the same panel. However, the same scenario could have led to a beam switch from beam 2.7 to adjacent beam 3.1 (i.e. between different panels) and still be considered an adjacent beam switch. The hardware and software procedures of performing a beam switch at the user device may be similar for an intra-panel adjacent beam switch and an inter-panel adjacent beam-switch, if the user device knows which beam to switch to and when to switch, i.e. making sure the needed panels are active.

Such an adjacent beam switch may be implemented autonomously at the user device (i.e. without assistance from the communication node), since it may be relatively easy for the user device to predict the next best user device beam to switch to.

Figure 8:
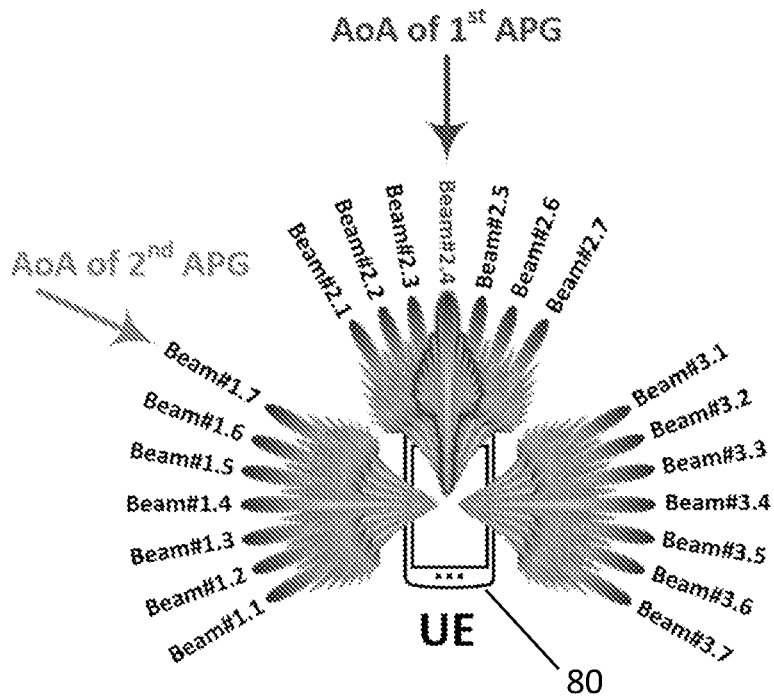

FIG. 8 is a block diagram of a user device (UE), indicated generally by the reference numeral 80, in accordance with an example embodiment. In common with the user device 60, the user device 80 includes a number of beams organised into three groups (provided by three panels). The first group comprises beams 1.1 to 1.7, the second group comprises beams 2.1 to 2.7 and the third group comprises beams 3.1 to 3.7. The signal channel shown in FIG. 8 is multi-directive and comprises more than one dominant Angular Power Group (APG) having an angles of arrival (AoA) such that the beam 2.4 and the beam 1.7 both represent good candidates for receiving transmission signals.

Figure 9:
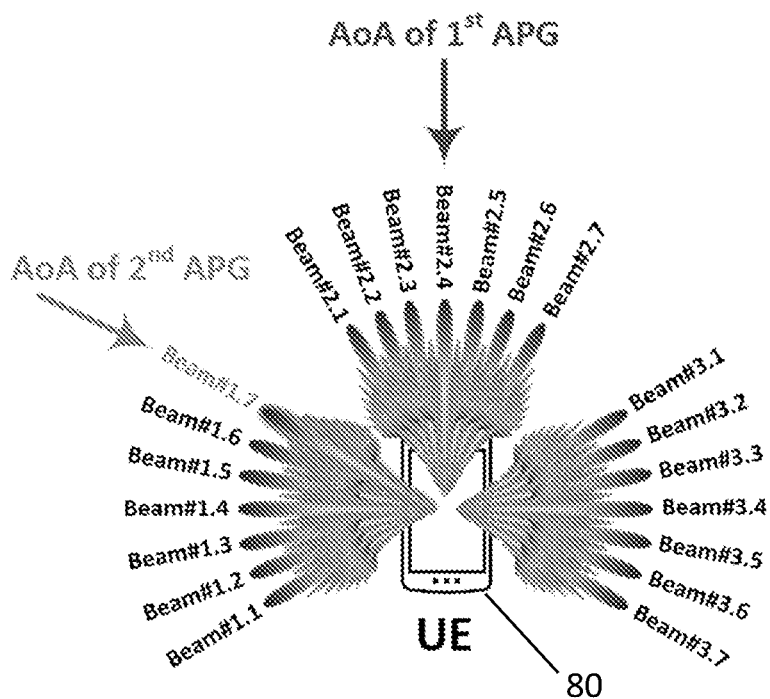

In FIG. 8, the beam 2.4 is being used for transmissions and is considered to be the first APG (with the beam 1.7 being the second APG). FIG. 9 is a block diagram of the user device 80 in which the beam 1.7 is being used for transmissions and is considered to be the first APG (with the beam 2.4 being the second APG).

Non-Adjacent beam switch (or communication node assisted beam switching) at the user device may happen when the channel is multi-directive and comprises more than one dominant APG (e.g. CDL-B and CDL-C channel models) and the user device is rotating and/or moving relative to the gNB. However, such a switch can also happen for a static user device due the changes in the channel caused for example by blockage of the dominant APG (or dominant radio channel cluster).

Performing non-adjacent beam switch may require assistance, since the user device most likely will not know the exact angular direction of the second APG (and may only know which of its panels to use). For example, the third phase 45 of the message sequence 40 described above may be triggered.

Of course, the configuration of the user devices 60 and 80 described above is provided by way of example only. Alternative user devices having different numbers of panels or different numbers of beams per panel could be used in example embodiments.

Figure 10:
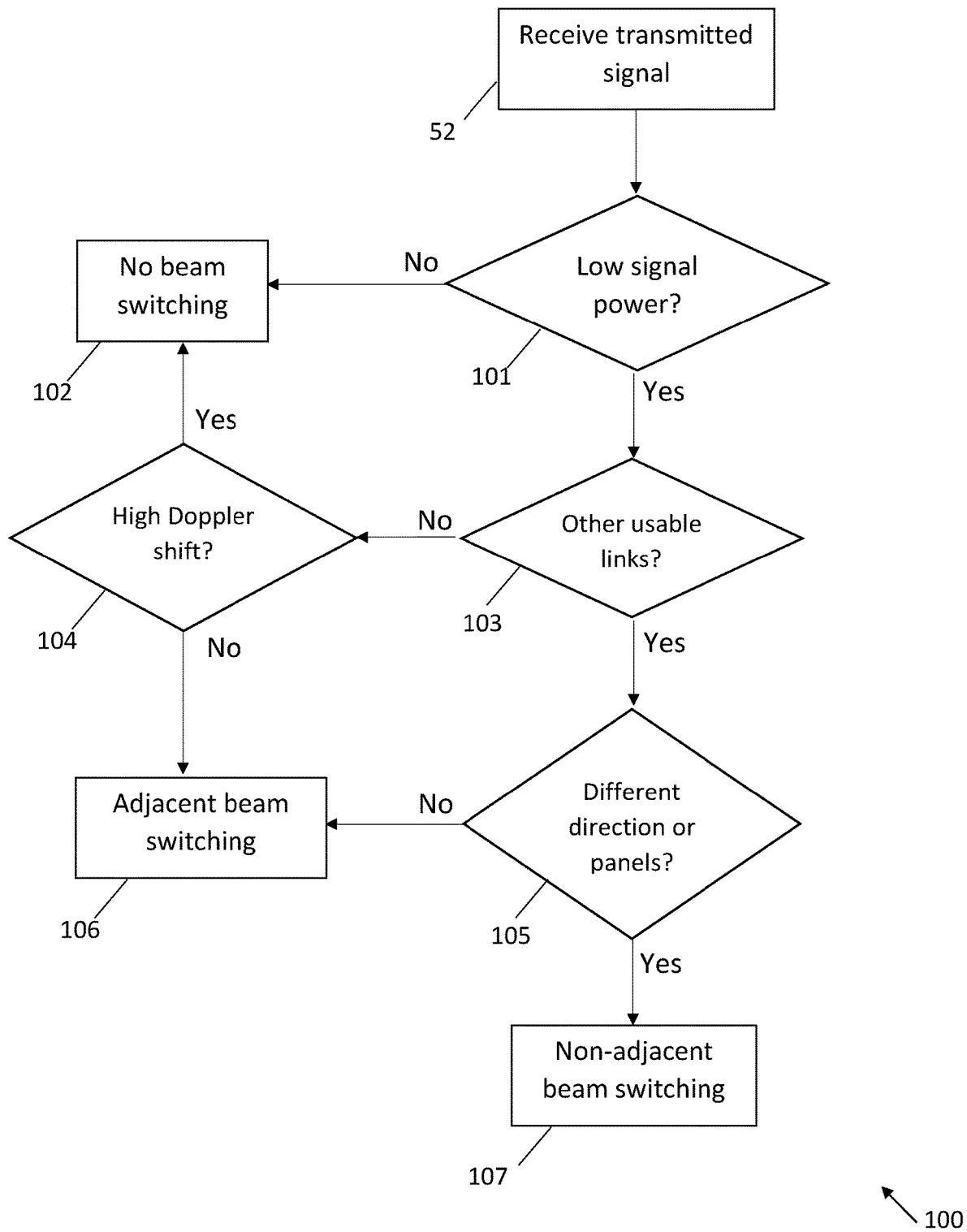
FIG. 10 is a flow chart showing an algorithm in accordance with an example embodiment.

FIG. 10 is a flow chart showing an algorithm, indicated generally by the reference numeral 100, in accordance with an example embodiment.

The algorithm 100 starts with the operation 52 described above, where a downlink reference signal is received at a user device from a communication node (e.g. a base station or gNB) of a mobile communication system. The downlink reference signal is received in the operation 52 by one of a plurality of beams of a receiver of the user device in accordance with a configured beam alignment (e.g. the beam 2.4 as shown in FIGS. 6 and 8). The algorithm then moves to operation 101.

At operation 101, the signal power (e.g. RSRP or some other metric, such as SNR, SINR, CQI etc.) of the received downlink reference signal is determined and compared to a threshold power level to determine whether the signal power has dropped below the threshold. If so (indicating that beam switching may be required), the algorithm moves to operation 103. If not, the algorithm terminates at operation 102, where no beam switching occurs.

At operation 103, a determination is made regarding whether the current properties of the channel between the said gNB and said UE supports candidate links other than the first link used for the configured beam alignment. By way of example, the channel properties shown in FIG. 6 and FIG. 7, only supports one first link. In the configuration shown in FIG. 8 and in FIG. 9, the channel properties supports a second link, called a usable candidate link.

A "usable candidate link" may be defined as an alternative link to the current serving link that has a sufficiently high signal strength (e.g. RSRP) to the relevant communication node. As discussed further below, a power delay profile (PDP) of received signals may be analysed to determine the existence of usable candidate links, which is dictated by the properties of the channel between the gNB and the UE.

If other usable candidate links are identified in the operation 103, then the algorithm 100 moves to operation 105; otherwise, the algorithm 100 moves to operation 104.

At operation 104, a determination is made regarding whether a Doppler shift of the received downlink reference signal is above a threshold level. If so, the existence of only a first link (as determined in the operation 103) having a high Doppler shift (as determined in the operation 104) suggests that the user device is moving away from the connected communication node and this is the likely source of the low power identified in the operation 101. Thus, no beam switching is required and the algorithm 100 terminates at the operation 102, without performing beam switching.

If the Doppler shift is determined in the operation 104 to not be above the threshold level, this indicates that rather than moving away from the connected communication node, the user device is likely being rotated or that there is some other cause for the low power signal. Thus, beam switching to an adjacent beam may be required so the algorithm 100 terminates at operation 106 where non-communication node assisted beam switching (or adjacent beam switching) is performed.

Figure 11:
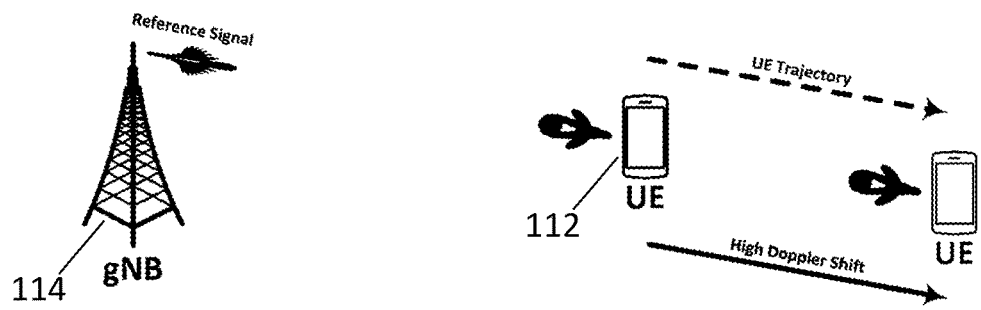
FIGS. 11 to 13 are block diagrams of systems in accordance with example embodiments.

FIG. 11 is a block diagram of a system, indicated generally by the reference numeral no, in accordance with an example embodiment. The system 110 shows the scenario described above in which a user device 112 is moving away from a gNB 114, resulting in a reduction in signal power (identified in the operation 101) and a high Doppler shift (identified in operation 104). As shown in the system no, the current connected beam likely remains the best beam to use and so no beam switching is required.

Figure 12:
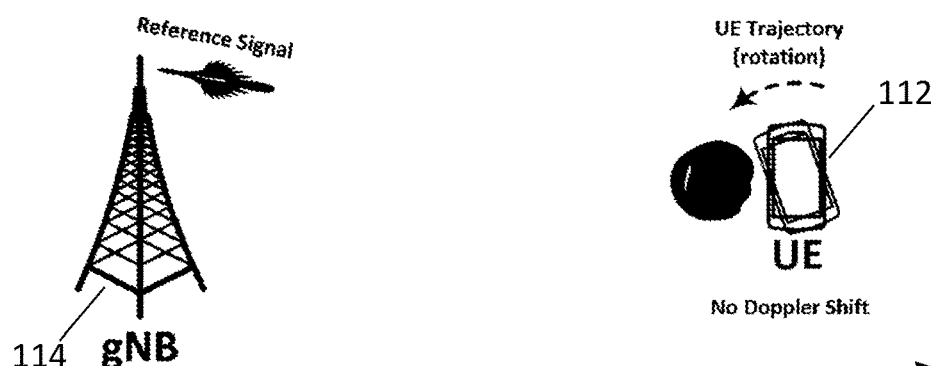

FIG. 12 is a block diagram of a system, indicated generally by the reference numeral 120, in accordance with an example embodiment. The system 120 shows the scenario described above in which the user device 112 is being rotated relative to the gNB 114, resulting in a reduction in signal power (identified in the operation 101), but no Doppler shift (identified in operation 104). An adjacent beam probably represents the best beam to use and so adjacent beam switching should be triggered.

At operation 105 of the algorithm 100, having determined that other usable links are available, a determination is made regarding whether the usable candidate links include at least one direction, which is a different direction to the direction of the first link used for the configured beam alignment and/or on a different receiver panel of the user device. A usable candidate link may be considered to have a "different" direction to the connected link in many ways, such as if its direction differs from the direction of the connected link by more than a threshold amount or if it is received by a different panel).

If it is determined in the operation 105 that none of the usable candidate links is from a different direction to the direction of the configured beam alignment, then the algorithm 100 terminates at operation 106, where adjacent beam switching is performed.

If it is determined in the operation 105 that at least one of the usable candidate links is from a different direction to the direction of the configured beam alignment and/or on a different receiver panel of the user device, then the algorithm 100 terminates at operation 107, where non-adjacent beam switching is performed.

In this way, the algorithm 100 seeks to intelligently trigger a UE beam alignment request when it is needed i.e. when the UE should perform a non-adjacent beam switch. This may, for example, prevent unnecessary CSI-RS signals (e.g. unnecessary third phase transmissions) being sent from the gNB and being processed at the UE. For example, the user device may determine if it should perform an autonomous adjacent beam switch or a gNB assisted non-adjacent beam switch based on characterization of the current channel conditions (e.g. the number of strong and usable APGs) and thereafter use Doppler shift calculations to determine if the APGs are arriving with different angular directions (see section 6 for a more detailed description).

Figure 13:
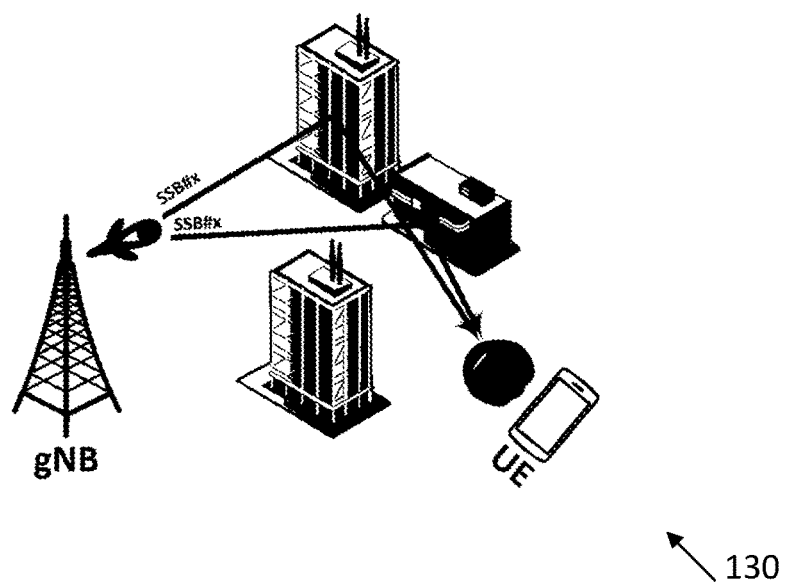

FIG. 13 is a block diagram of a system, indicated generally by the reference numeral 130, in accordance with an example embodiment. The system 130 shows an example scenario in which two different angular power groups (APGs) are received at a user device (UE) from a similar angular direction, but with a different delay. A UE autonomous adjacent beam switch may be the optimal choice for the user device in this situation, since the UE has some knowledge of the angular direction of the incoming signal.

Figure 14:
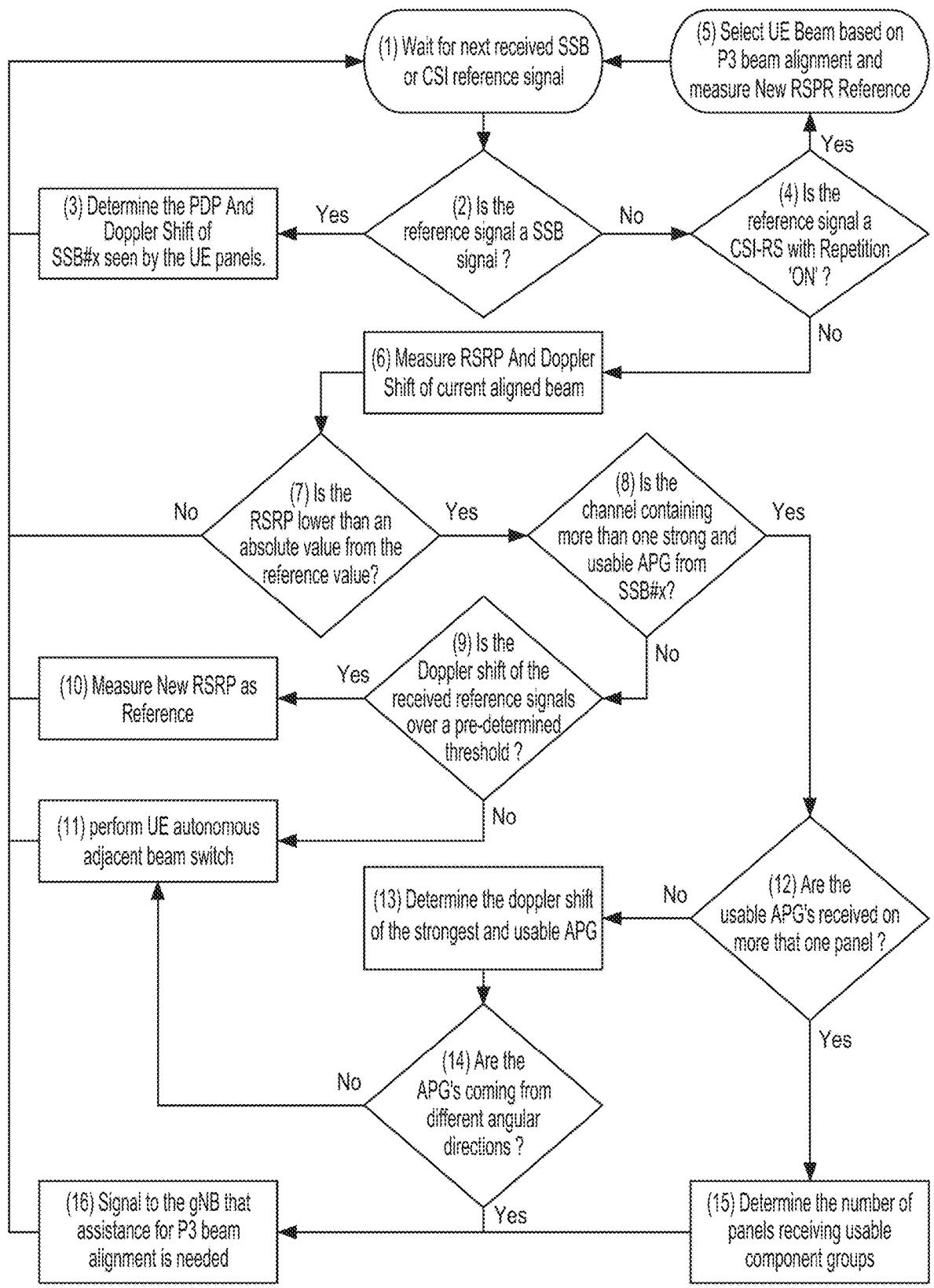
FIG. 14 is a flow chart showing an algorithm in accordance with an example embodiment.

FIG. 14 is a flow chart showing an algorithm, indicated generally by the reference numeral 140, in accordance with an example embodiment. The algorithm 140 is similar to the algorithm 100 described above.

The algorithm 140 starts at step 1, which is a wait state. On reception of the next received reference signal at the user device, the algorithm 140 moves to step 2. Thus, step 1 is similar to the operation 52 of the algorithms 50 and 100 described above.

Step 2 determines whether the reference signal received in step 1 is a synchronisation signal block (SSB) signal. If so, the algorithm 140 moves to step 3; otherwise, the algorithm 140 moves to step 4.

At step 3, the power delay profile (PDP) and Doppler shift of the SSB beam received in step 1 at the user device on all panels is determined and stored. This may form part of a standard panel sweeping procedure (as discussed above with reference to FIGS. 3 and 4).

Step 4 follows from a determination (in step 2) that the received signal is not an SSB beam. Step 4 determined whether the received signal is a channel state information reference signal (CSI-RS) with repetition 'ON'. Such a signal may be sent as part of the third phase 45 of the message sequence 40 described above.

If the received signal is a CSI-RS signal with repetition 'ON', the algorithm moves to step 5, where beam alignment is performed at the user device with assistance from the gNB and a new reference RSRP value is measured and stored. The algorithm then returns to the wait state (step 1). Otherwise, the algorithm moves to step 6, where the RSRP and Doppler shift of the received signal is measured and stored. The algorithm then moves to step 7. It should be noted that RSRP is described here by way of example only; many other metrics (such as SNR, SINR, CQI etc.) could be considered instead of, or addition to, RSRP in some example embodiments.

At step 7, the RSRP value measured in step 6 is compared with a threshold power level. That threshold power level was previously stored (for example in a previous iteration of the step 5 discussed above or step 10 discussed below). If the RSRP value is lower than the reference RSRP value (perhaps with some margin of error, such as 3 dB), the algorithm 140 moves to step 8. Otherwise, the algorithm returns to the wait state (step 1) so that no beam switching is carried out.

By step 8, it has been determined that a received downlink reference signal is not either an SSB signal or a CSI-RS with repetition "ON" and that the RSRP is lower than a reference/threshold value.

At step 8, if the channel contains more than one usable angular power group (APG) from the respective SSB, then then algorithm moves to step 12. Otherwise, the algorithm moves to step 9. A "usable" APG may be one that has a good enough RSRP level to be used for communications—a threshold level for this could be set. As discussed further below, this may be determined by analysing a power delay profile (PDP) of the received downlink reference signal.

At step 9, if the Doppler shift (measured in step 6) is above a pre-determined threshold (suggesting that the user device is moving away from the gNB and beam switching is not needed), then the algorithm moves to step 10. If the Doppler shift is below that threshold (suggesting that the user device is being rotated and that beam switching is required), then the algorithm moves to step 11. This step could be supplemented with other measurement data, for example using user device sensors such as GNSS, gyroscope and the like (if available).

By step 10, it has been determined that determined that a received downlink reference signal is not either an SSB signal or a CSI-RS with repetition "ON", that the RSRP is lower than a reference/threshold value, that the channel contains only one usable angular power group (APG) from the respective SSB and that the Doppler shift of the received downlink reference signal is above a threshold level. As a result, no beam switching is required. Thus, at step 10, a new RSRP measurement is taken and stored as an updated reference of the user device and the algorithm 140 returns to the wait state (step 1).

By step 11, it has been determined that determined that a received downlink reference signal is not either an SSB signal or a CSI-RS with repetition "ON", that the RSRP is lower than a reference/threshold value, that the channel contains only one usable angular power group (APG) from the respective SSB and that the Doppler shift of the received downlink reference signal is below a threshold level. As a result, beam switching is required. Thus, at step 11, the user device preform autonomous adjacent beam switching and the algorithm returns to the wait state (step 1).

As discussed above, the algorithm 140 moves to step 12 in the event that more than one usable APG is identified in the step 8 discussed above. At step 12, a determination is made regarding whether usable APGs are received more than one panel. If so, the algorithm moves to step 15; otherwise, the algorithm moves to step 13.

At step 13, the Doppler shift of the strongest of the APGs is measured. Then, at operation 14, a determination is made regarding whether the APGs are coming from different angular directions (e.g. at angles that differ by more than a threshold amount). If so, the algorithm moves to step 16 (where communication node assisted beam switching is initiated). Otherwise, the algorithm moves to step 11 where, as discussed above, adjacent beam switching is carried out.

At step 15, the number of panels receiving usable APGs is determined. The algorithm then moves to step 16.

By step 16, it has been determined that communication node assisted beam switching should be initiated. This may be implemented by the user device signalling to the gNB. For example, the user device may request a specific number of CSI-RS signals with repetition 'ON' be transmitted or indicate to the gNB that CSI-RS with repetition 'ON' is not needed anymore when it has completed its beam alignment.

Thus, the algorithm 140 (and the algorithms 50 and 100 described above) enable a user device to determine if assistance is required from a gNB (or some other communication node) to perform beam alignment and signals this to the gNB. The gNB will thereby only allocation CSI-RS with repetition 'ON' when needed.

Figure 15:
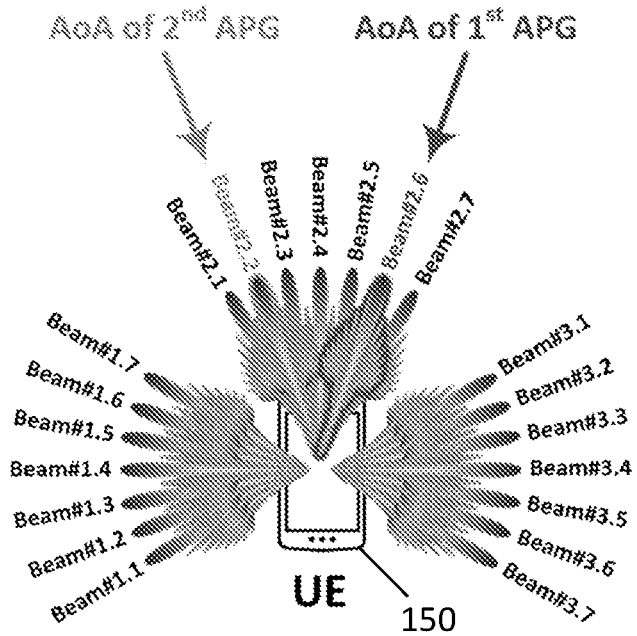
FIG. 15 is a block diagram of a user device in accordance with an example embodiment.
Figure 16:
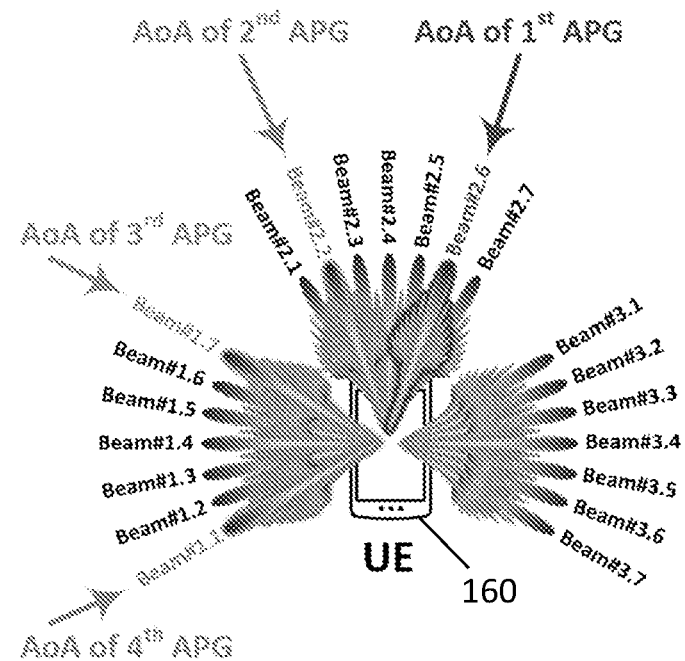
FIG. 16 is a block diagram of a user device in accordance with an example embodiment.
Figure 17:
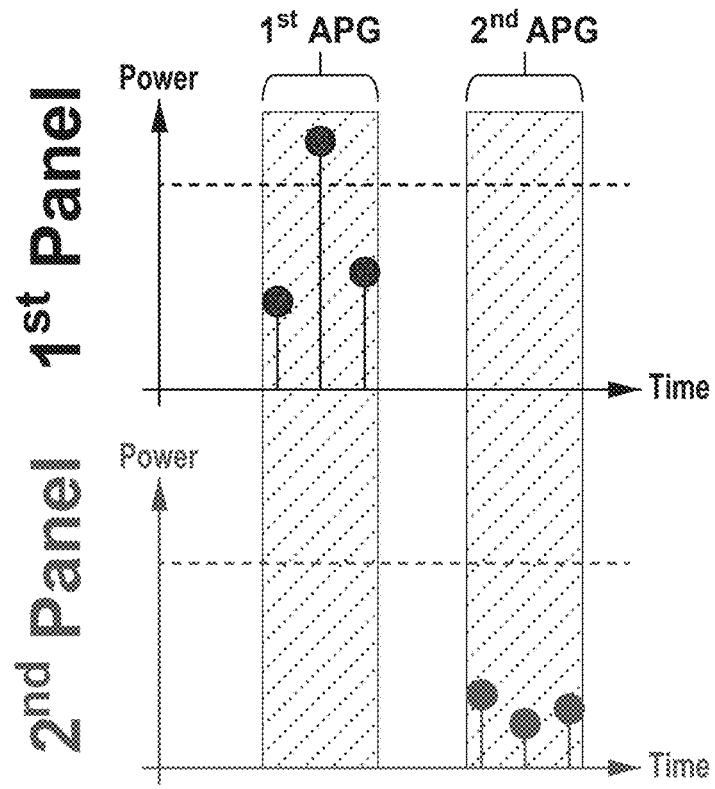
FIGS. 17 to 20 are plots showing signals in accordance with example embodiments.
Figure 18:
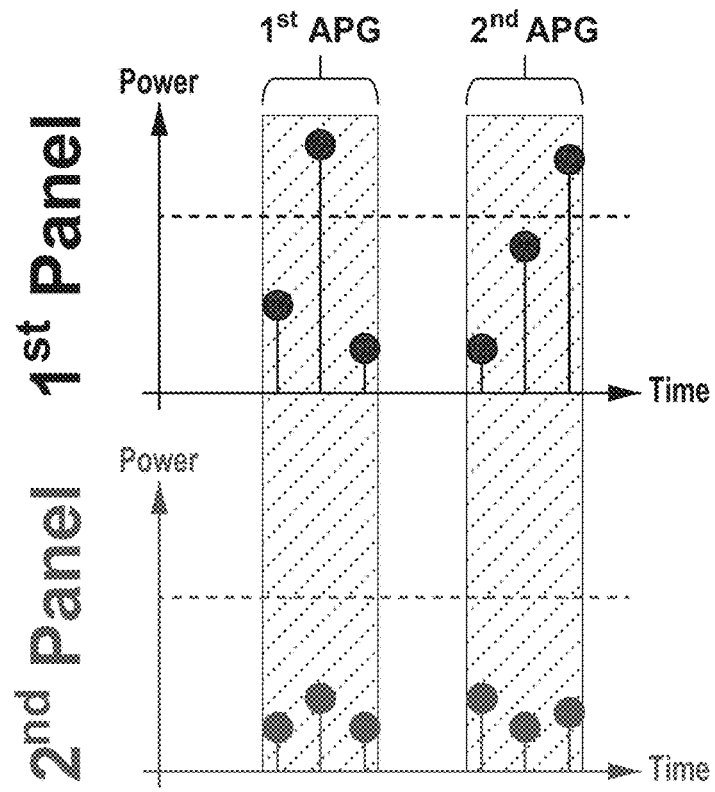
Figure 19:
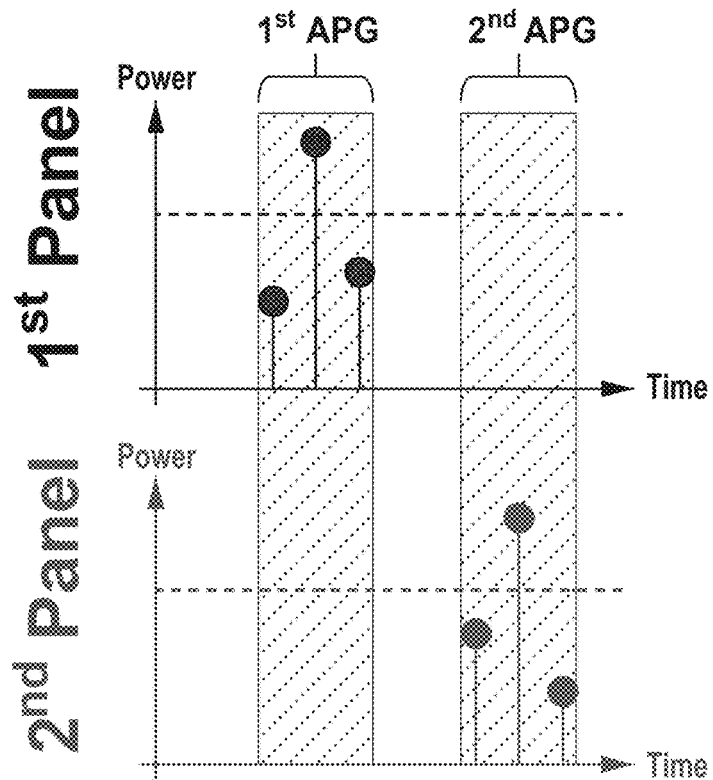
Figure 20:
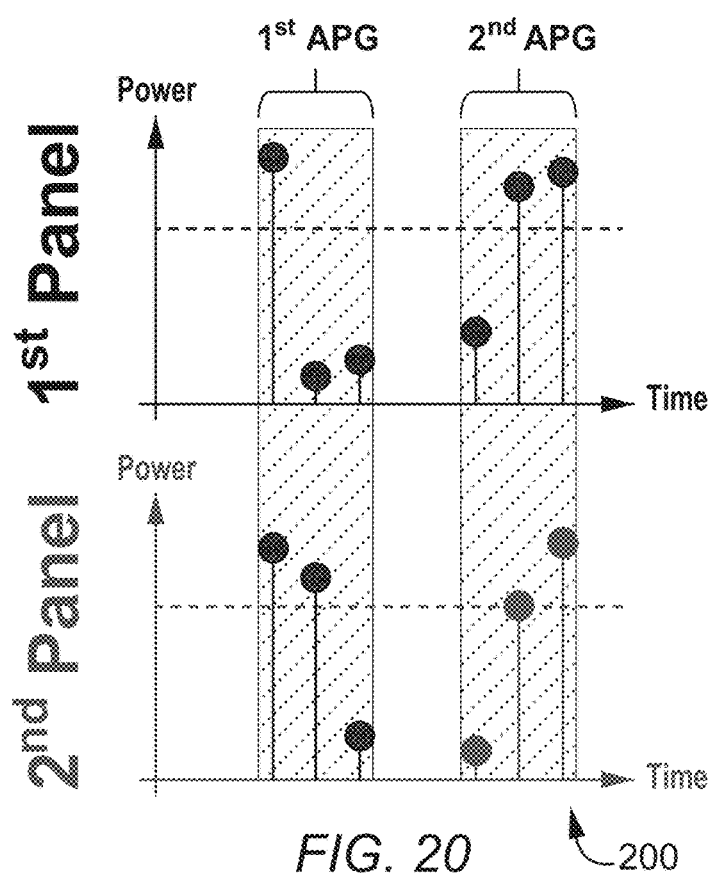

As discussed above, FIGS. 6 to 9 are block diagrams of a user devices 60 and 80. FIGS. 15 and 16 are block diagrams of user devices 150 and 160 respectively in accordance with example embodiments. The user devices 60, 80, 150 and 160 may be used in example implementations of the algorithms 50, 100 and 140.

The user devices 60, 80, 150 and 160 comprises multiple panels, each having multiple beams that can be used for communication. Each panel may periodically scan for the gNB transmitted SSB signals as part of the general beam management procedure. This scanning procedure can be done simultaneously or sequentially, depending on the UE hardware capabilities. However, this is not that important for this invention if the scanning procedure can be completed within the coherence time of the channel.

A user device used in an implementation of the algorithm 140 knows which SSB beam index contains the CSI beam that it is currently connected to. The user device will measure the power delay profile (PDP) of that SSB beam index on all its panels, while performing the general beam management procedure. The result obtained from the SSB#x measurements can be divided into one of four possible outcomes, as highlighted below:

First outcome: One panel receiving one angular power group (APG) of SSB#x. This is the scenario shown in FIGS. 6 and 7. In this scenario, there is no need for non-adjacent beam switching; thus, any beam switching is adjacent beam switching.

Second outcome: One panel receiving multiple APGs of SSB#x. This is the scenario shown in FIG. 15. In this scenario, either adjacent or non-adjacent beam switching may be required, depending on the circumstances.

Third outcome: Multiple panels each receiving one APG of SSB#x. This is the scenario shown in FIGS. 8 and 9. In this scenario, non-adjacent beam switching may be required.

Fourth outcome: Multiple panels receiving one or more APGs of SSB#x. This is the scenario shown in FIG. 16. In this scenario, non-adjacent beam switching may be required.

A user device (such as the user devices 60, 80, iso and 160) may make the following conclusions from the four different result outcomes discussed above.

The first result outcome (one panel receiving one angular power group (APG) of SSB#x) may occur in response to step 8 of the algorithm 140 being answered in the negative. The first result outcome has two variants depending on the answer to step 9 (i.e. whether or not the Doppler shift is above the relevant threshold).

Result outcome #1a (No in #8 and No #9): Only one panel is receiving an RSRP value of SSB#x over a certain threshold to characterize it as a usable strong APG and with a low Doppler Shift. Thus, the user device will perform an autonomous adjacent beam switch, since the reduction in RSRP is most likely caused by UE rotation and/or movement and an adjacent beam will be the best new beam choice.

Result outcome #1b (No in #8 and yes #9): Only one panel is receiving an RSRP value of SSB#x over a certain threshold to characterize it as a usable strong APG and with a high Doppler Shift. Thus, the user device will not perform a beam switch, since the reduction in RSRP is most likely caused by the UE moving away from the gNB. But the UE will perform a New RSRP reference measurement.

The second result outcome (one panel receiving multiple angular power group (APGs) of SSB#x) may occur in response to step 12 of the algorithm 140 being answered in the negative. The second result outcome has two variants depending on the answer to step 14 (i.e. whether or not the APGs are coming from different angular directions.

Result outcome #2a: (Yes in #8, No in #12 and Yes in #14): Multiple APGs of SSB#x are received at a single panel at the UE with RSRP values over a certain threshold and from different angular directions. The UE has no angular direction knowledge (only power) of all of the multiple APGs and need assistance from the gNB to determine the best APG. Thus, the user device will request y number of CSI-RS signals with repetition 'ON', where y could equal the number of configurable beams on that array.

Result outcome #2b: (Yes in #8, No in #12 and No in #14): Multiple APGs of SSB#x are received at a single panel at the UE with RSRP values over a certain threshold but from the same angular directions (within the 3 dB beam wide of the intended aligned UE beam). Thus, the user device will perform an autonomous adjacent beam switch, since the reduction in RSRP is most likely caused by UE rotation and/or movement and an adjacent beam will be the best new beam choice.

The third result outcome (multiple panels each receiving one APG) may occur in response to step 12 of the algorithm 140 being answered in the positive.

Result outcome #3: (Yes in #8 and Yes in #12): Single APGs of SSB#x are received on multiple panels at the user device. The user device might have some directional knowledge for the APG received on the panel currently connected with the gNB. However, the UE has no directional knowledge from other panels; thus, the user device will request z number of CSI-RS signals with repetition 'ON', where z could be a multiplication of:

Reduced scan for the connected panel.
Full scans for the remaining panels.

The fourth result outcome (multiple panels each receiving multiple APGs) may occur in response to step 12 of the algorithm 140 being answered in the positive.

Result outcome #4: (Yes in #8 and Yes in #12): Multiple APGs of SSB#x are received on multiple panels at the UE. The user device has no directional knowledge of any APGs. Thus, the user device will request v number of CSI-RS signals with repetition 'ON', where v could be the multiplication of full beam scans of all affected panels.

FIGS. 17 to 20 are plots, indicated generally by the reference numerals 170 to 200 respectively, showing signals in accordance with an example embodiments.

The difference in power delay profile (PDP) measurement of two panels are illustrated in FIGS. 17 to 20 for the four result outcomes described above. Thus, the plot 170 shows the first panel receiving one APG above the relevant threshold, the plot 180 shows the first panel receiving multiple APGs above the relevant threshold, the plot 190 shows the first and second panels both receiving one APG above the relevant threshold, and the ploy 200 shows the first and second panels both receiving multiple APGs above the relevant threshold.

Although the PDP measurements are shown in FIGS. 17 to 20 for two panels only, any number of panels could be used.

Figure 21:
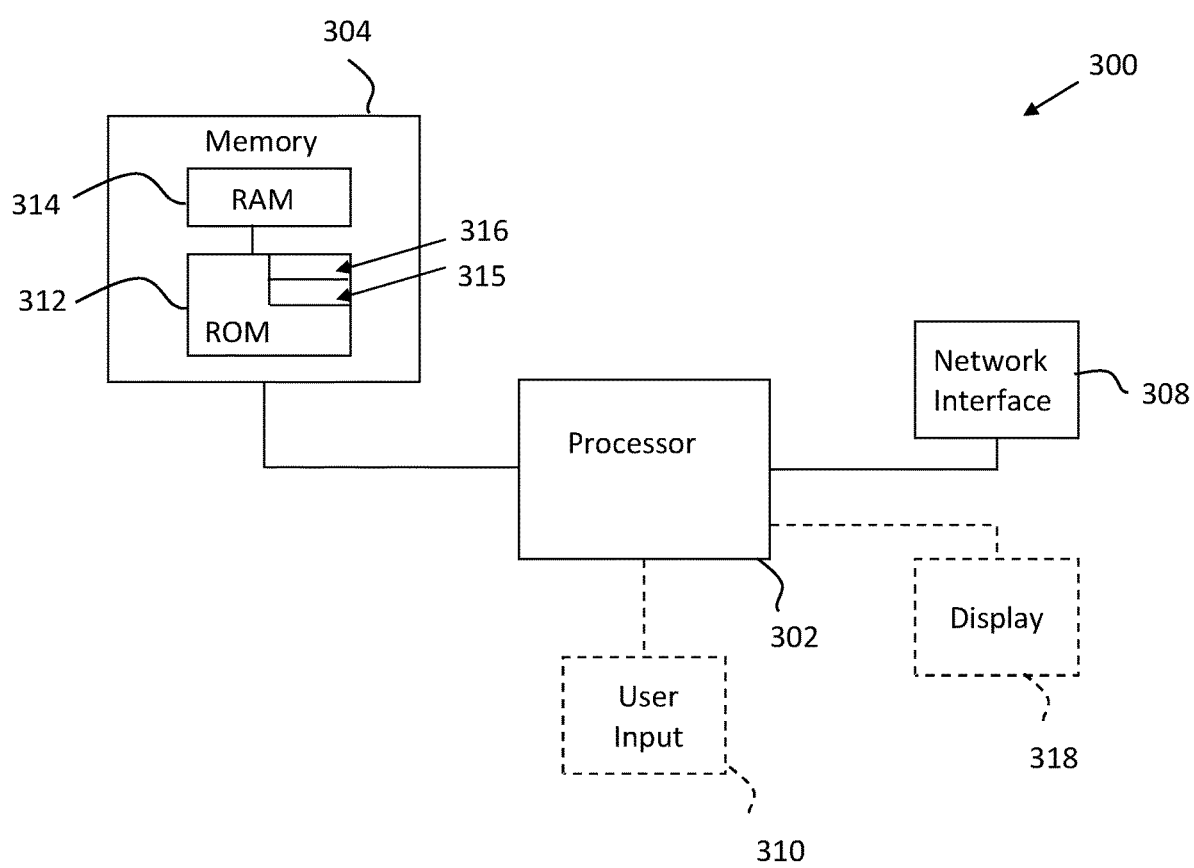
FIG. 21 is a block diagram of components of a system in accordance with an example embodiment.

For completeness, FIG. 21 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms and message sequences 30, 40, 50, 100 and 140 described above. Note that in the case of small device/ apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 22A:
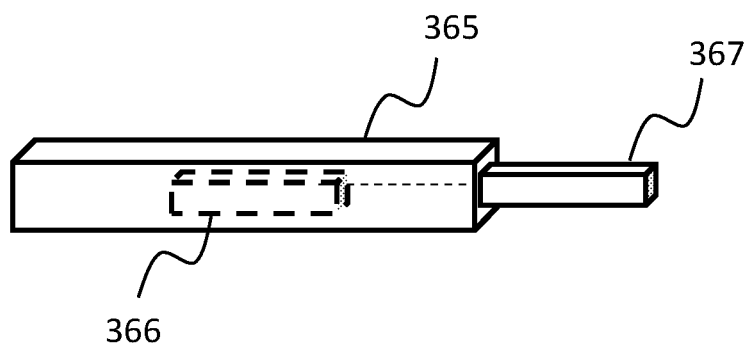
FIGS. 22A and 22B show tangible media, respectively a removable non-volatile memory unit and a compact disc (CD) storing computer-readable code which when run by a computer perform operations according to example embodiment.
Figure 22B:
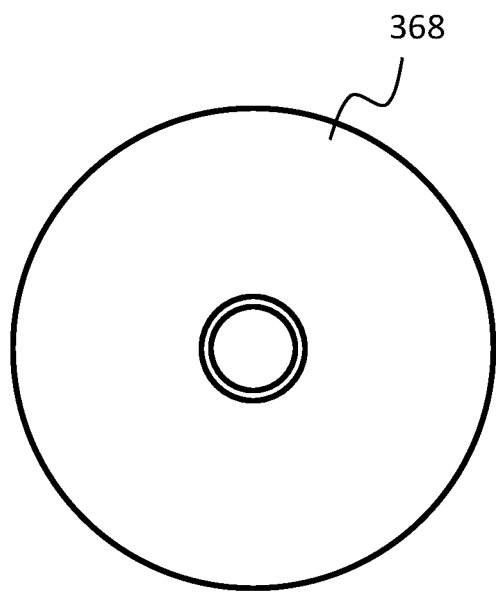

FIGS. 22A and 22B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams and message sequences of FIGS. 3, 4, 5, 10 and 14 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus, comprising:
   at least one processor; and
   at least one memory including computer program code, the at least one memory and computer program code being configured, with the at least one processor, to cause the apparatus to perform:
   receiving a downlink reference signal from a communication node of a mobile communication system, wherein the downlink reference signal is received by one of a plurality of beams of a receiver of the apparatus in accordance with a configured beam alignment;
   determining whether to initiate beam switching to reconfigure the beam alignment at said receiver based, at least in part, on a signal power of the received downlink reference signal; and
   determining, in the event that beam switching is to be initiated, whether to initiate communication node assisted beam switching or non-communication node assisted beam switching.

2. The apparatus as claimed in claim 1, wherein the at least one memory and computer program code are further configured to cause the apparatus to perform:
   sending a signal to the communication node triggering communication node assistance in the event that a determination is made to initiate communication node assisted beam switching.

3. The apparatus as claimed in claim 1, wherein the at least one memory and computer program code are further configured to cause the apparatus to perform:
   initiating autonomous beam switching in the event that a determination is made to initiate non-communication node assisted beam switching.

4. The apparatus as claimed in claim 1, wherein the at least one memory and computer program code are further configured to cause the apparatus to perform:
   determining the signal power of the received downlink reference signal; and
   comparing the determined signal power to a threshold power level for use in determining whether to initiate beam switching.

5. The apparatus as claimed in claim 1, wherein the at least one memory and computer program code are further configured to cause the apparatus to perform:
   identifying whether a channel between the communication node and the apparatus supports one or more usable candidate links other than a first link used for the configured beam alignment.

6. The apparatus as claimed in claim 5, wherein the performing identifying whether the channel between the communication node and the apparatus supports one or more usable candidate links of the receiver other than the first link used for the configured beam alignment comprises analysing a power delay profile of the received downlink reference signal.

7. The apparatus as claimed in claim 5, wherein the at least one memory and computer program code are further configured to cause the apparatus to perform:
   determining whether a Doppler shift of the received downlink reference signal is above a threshold level;
   initiating non-communication node assisted beam switching in the event that beam switching is initiated, no usable candidate links other than the first link are identified and the Doppler shift of the received downlink reference signal is not above the threshold level; and
   not initiating beam switching in the event that no usable candidate links other than the first link are identified and the Doppler shift is above the threshold level.

8. The apparatus as claimed in claim 5, wherein the at least one memory and computer program code are further configured to cause the apparatus to perform:

initiating communication node assisted beam switching in the event that beam switching is initiated, one or more usable candidate links other than the first link are identified and said usable candidate links include at least one link directed in a different direction to the first link used for the configured beam alignment and/or on a different receiver panel of the apparatus; and initiating non-communication node assisted beam switching in the event that beam switching is initiated, one or more usable candidate links other than the first link are identified and said usable candidate links do not include any links directed in a different direction to the first link.

9. A method, comprising:

receiving, at a user device, a downlink reference signal from a communication node of a mobile communication system, wherein the downlink reference signal is received by one of a plurality of beams of a receiver of the user device in accordance with a configured beam alignment;

determining whether to initiate beam switching to reconfigure the beam alignment at said receiver based, at least in part, on a signal power of the received downlink reference signal; and determining, in the event that beam switching is to be initiated, whether to initiate communication node assisted beam switching or non-communication node assisted beam switching.

10. The method as claimed in claim 9, further comprising:

sending a signal to the communication node triggering communication node assistance in the event that a determination is made to initiate communication node assisted beam switching.

11. The method as claimed in claim 9, further comprising:

initiating autonomous beam switching at the user device in the event that a determination is made to initiate non-communication node assisted beam switching.

12. The method as claimed in claim 9, further comprising:

identifying whether a channel between the communication node and the user device supports one or more usable candidate links other than a first link used for the configured beam alignment;

determining whether a Doppler shift of the received downlink reference signal is above a threshold level;

initiating non-communication node assisted beam switching in the event that beam switching is initiated, no usable candidate links other than the first link are identified and the Doppler shift of the received downlink reference signal is not above the threshold level; and not initiating beam switching in the event that no usable candidate links other than the first link are identified the Doppler shift is above the threshold level.

13. The method as claimed in claim 12, further comprising:

initiating communication node assisted beam switching in the event that beam switching is initiated, one or more usable candidate links other than the first link are identified and said usable candidate links include at least one link directed in a different direction to the first link for the configured beam alignment and/or on a different receiver panel of the user device; and initiating non-communication node assisted beam switching in the event that beam switching is initiated, one or more usable candidate links other than the first link are identified and said usable candidate links do not include any links directed in a different direction to the first link.

14. A computer program embodied on a non-transitory computer-readable medium, said computer program comprising instructions for causing an apparatus to perform at least:

receiving, at a user device, a downlink reference signal from a communication node of a mobile communication system, wherein the downlink reference signal is received by one of a plurality of beams of a receiver of the user device in accordance with a configured beam alignment;

determining whether to initiate beam switching to reconfigure the beam alignment at said receiver based, at least in part, on a signal power of the received downlink reference signal; and determining, in the event that beam switching is to be initiated, whether to initiate communication node assisted beam switching or non-communication node assisted beam switching.

* * * * *